United States Patent
Wu (10) Patent No.: US 9,945,329 B2
(45) Date of Patent: Apr. 17, 2018

(54) ENGINE WITH CYLINDER DEACTIVATION AND MULTI-STAGE TURBOCHARGING SYSTEM

(71) Applicant: GM GLOBAL TECHNOLOGY OPERATIONS LLC, Detroit, MI (US)

(72) Inventor: Ko-Jen Wu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 14/329,016

(22) Filed: Jul. 11, 2014

(65) Prior Publication Data

US 2016/0010594 A1     Jan. 14, 2016

(51) Int. Cl.
F02B 33/44     (2006.01)
F02B 37/00     (2006.01)
(Continued)

(52) U.S. Cl.
CPC ......... F02M 25/071 (2013.01); F02B 37/004 (2013.01); F02B 37/013 (2013.01);
(Continued)

(58) Field of Classification Search
CPC ..... F02M 25/071; F02B 37/16; F02B 37/001; F02B 37/002; F02B 37/004; F02B 37/007;
(Continued)

(56) References Cited

U.S. PATENT DOCUMENTS

| | | | |
|---|---|---|---|
| 4,495,602 A * | 1/1985 | Sheppard | G11C 11/56 365/104 |
| 7,470,209 B2 * | 12/2008 | Holmes | B60K 6/365 180/65.28 |

(Continued)

FOREIGN PATENT DOCUMENTS

| | | |
|---|---|---|
| CN | 203035339 U | 7/2013 |
| CN | 103244266 A | 8/2013 |

(Continued)

OTHER PUBLICATIONS

DE 102008029197 A1 English Translation.*

*Primary Examiner* — Jason Shanske
*Assistant Examiner* — Jessica Kebea
(74) *Attorney, Agent, or Firm* — Quinn IP Law (57) ABSTRACT

An internal combustion engine includes a cylinder block defining first and second cylinders, and a cylinder head coupled to the block. The engine also includes a passage having a first outlet and a second outlet for exhausting post-combustion gasses from the cylinder head. The engine additionally includes a mechanism for selectively activating and deactivating the first cylinder and a turbocharging system having a low-flow turbocharger and a high-flow turbocharger. The low-flow turbocharger is driven by gasses from the first outlet and the high-flow turbocharger is driven by gasses from the second outlet. The turbocharging system also includes a first flow-control device that directs the gasses via the first and second outlets to the turbochargers (Continued)

when the first and second cylinders are activated. The first flow-control device also directs the gasses via the first outlet only to the low-flow turbocharger and blocks the second outlet when the first cylinder is deactivated.

16 Claims, 4 Drawing Sheets

(51) Int. Cl.
*F02B 37/013* (2006.01)
*F02B 37/12* (2006.01)
*F02B 37/16* (2006.01)
*F02B 37/18* (2006.01)
*F02D 17/02* (2006.01)
*F02M 25/07* (2006.01)

(52) U.S. Cl.
CPC ............ *F02B 37/127* (2013.01); *F02B 37/16* (2013.01); *F02B 37/18* (2013.01); *F02D 17/02* (2013.01); *Y02T 10/144* (2013.01)

(58) Field of Classification Search
CPC .. F02B 37/013; F02B 37/18; F02B 2037/162; F02D 41/0087; F02D 17/02; F02D 13/06
USPC .................................................... 60/604, 612
See application file for complete search history.

(56) References Cited

U.S. PATENT DOCUMENTS

| | | | |
|---|---|---|---|
| 8,141,358 B2* | 3/2012 | Kolmanovsky | F01L 9/04 123/399 |
| 9,068,500 B2* | 6/2015 | Weber | F02B 37/002 |
| 2007/0074513 A1* | 4/2007 | Lamb | F01N 13/107 60/612 |
| 2012/0085299 A1* | 4/2012 | Kuhlbach | F02F 1/243 123/41.72 |
| 2012/0167857 A1* | 7/2012 | Barnes | B60K 6/48 123/198 R |
| 2012/0285164 A1* | 11/2012 | Kuhlbach | F02B 37/007 60/602 |
| 2013/0131940 A1* | 5/2013 | Yamamoto | F02D 29/00 701/54 |
| 2013/0167528 A1* | 7/2013 | Schlund | F02M 25/07 60/612 |
| 2015/0167590 A1* | 6/2015 | Otto Zur Loye | F02M 21/0287 60/601 |
| 2015/0240705 A1* | 8/2015 | Wu | F02B 37/007 60/601 |

FOREIGN PATENT DOCUMENTS

| | | | |
|---|---|---|---|
| CN | 103261621 A | 8/2013 | |
| DE | 102008029197 A1 * | 12/2009 | ............ F02B 37/127 |
| EP | 1619368 A1 * | 1/2006 | ............ F02B 37/007 |

* cited by examiner

ENGINE WITH CYLINDER DEACTIVATION AND MULTI-STAGE TURBOCHARGING SYSTEM

TECHNICAL FIELD

The present disclosure relates to an internal combustion engine with cylinder deactivation and a multi-stage turbocharging system.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

Additionally, ICE's are being methodically developed to consume smaller amounts of fuel. Various technologies are frequently incorporated into ICE's to generate on-demand power, while permitting the subject engine to operate in a more fuel efficient mode. Such fuel saving technologies may shut off operation of some of the engine's cylinders when engine power requirement is reduced and even completely stop the engine when no engine power is required.

SUMMARY

One embodiment of the disclosure is directed to an internal combustion engine that includes a cylinder block defining a first cylinder and a second cylinder. The engine also includes a cylinder head coupled to the cylinder block and configured to supply air and fuel to the first cylinder and to the second cylinder for respective combustion therein, and exhaust post-combustion gasses from the first and second cylinders. The engine also includes a passage in fluid communication with the cylinder head and having a first outlet and a second outlet for exhausting the post-combustion gasses. The engine additionally includes a mechanism configured to selectively activate and deactivate the first cylinder, and a turbocharging system configured to pressurize an airflow being received from the ambient for delivery to the cylinder head.

The turbocharging system includes a low-flow (high-pressure) turbocharger and a high-flow (low-pressure) turbocharger. Each turbocharger is configured to pressurize the airflow for delivery to the cylinder head. The low-flow turbocharger is driven by the post-combustion gasses from the first outlet, and the high-flow turbocharger is driven by the post-combustion gasses from the second outlet. The turbocharging system also includes a first flow-control device (bypass valve). The first flow-control device selectively directs the post-combustion gasses via the first and second outlets to the respective low-flow and high-flow turbochargers when the first and second cylinders are activated, and directs the post-combustion gasses via the first outlet to the low-flow turbocharger and block the second outlet when the first cylinder is deactivated via the mechanism.

The engine may also include an exhaust manifold operatively connected to the cylinder head. In such a case, the exhaust manifold may define each of the first and second outlets.

The exhaust manifold may be integrated into the cylinder head. Additionally, the cylinder head may be integrated into or cast together with the cylinder block.

The first flow-control device may be mounted at the second outlet.

The first flow control device may be additionally configured to direct the post-combustion gasses via the first outlet to the low-flow turbocharger and block the second outlet when the first and second cylinders are activated and the engine operates up to a predetermined speed The engine may also include a programmable controller configured to regulate operation of the first flow-control device. The controller may be programmed to open the first flow-control device to direct the post-combustion gasses for driving the low-flow turbocharger and the high-flow turbocharger. The controller may be additionally programmed to close the first flow-control device to direct the post-combustion gasses for driving the low-flow turbocharger and block the post-combustion gasses from driving the high-flow turbocharger.

Each of the low-flow and high-flow turbochargers may include a respective turbine wheel configured to receive the post-combustion gasses. Additionally, the high-flow turbocharger may include a waste-gate valve configured to selectively open and close a bypass for the post-combustion gasses around the turbine wheel of the high-flow turbocharger.

Each of the low-flow and high-flow turbochargers may include a respective compressor configured to pressurize the airflow. In such a case, each compressor may include a relatively low-pressure inlet and a relatively high-pressure outlet. The turbocharging system may additionally include a second flow-control device configured to selectively open and close a fluid path between the inlet and the outlet of the compressor of the low-flow turbocharger.

The controller may be additionally configured to regulate operation of the second flow-control device and coordinate opening the second flow-control device together with opening the first flow-control device, i.e., the controller may be configured to open both the first and second flow-control devices substantially simultaneously.

The low-flow turbocharger and the high-flow turbocharger may be arranged in series. In such an arrangement the airflow is received by the compressor of the low-flow turbocharger after having been received by and passed through the compressor of the high-flow turbocharger.

Another embodiment of the present disclosure is directed to a vehicle employing the engine as described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
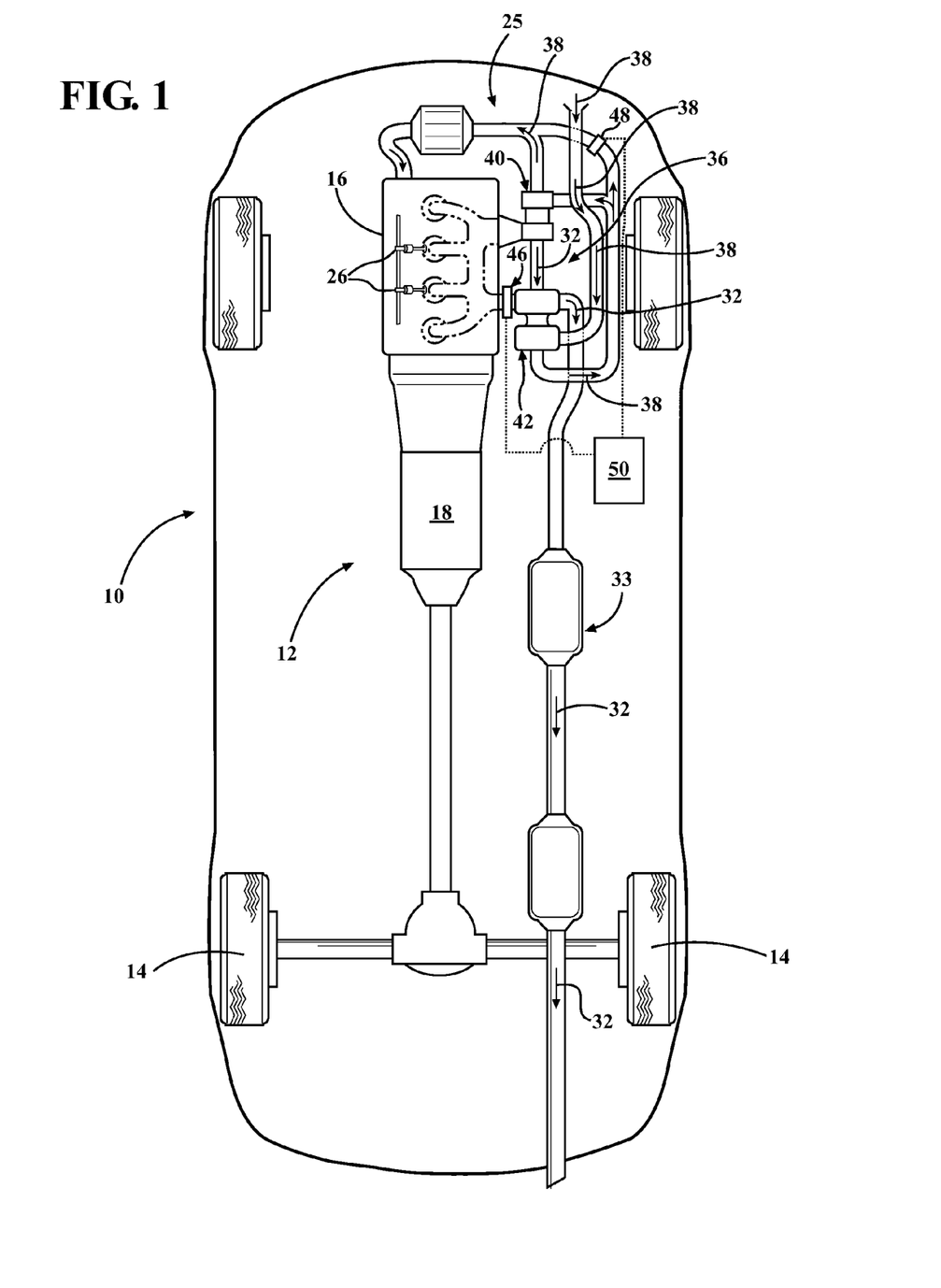
FIG. 1 is a schematic depiction of a vehicle having an engine with a multi-stage turbocharging system according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
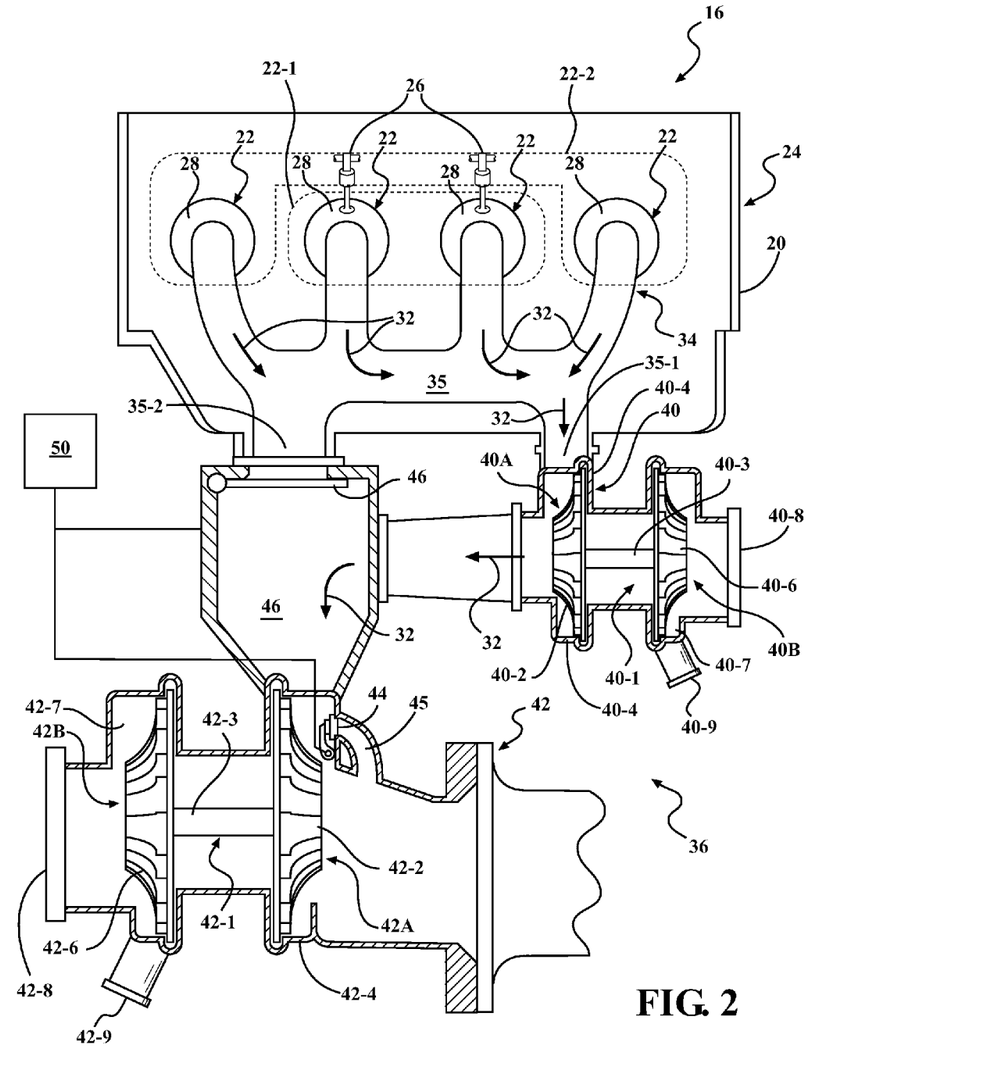
FIG. 2 is a schematic partially cross-sectional top view of an engine with the multi-stage turbocharging system shown in FIG. 1 operating in cylinder-deactivation mode.
Figure 3:
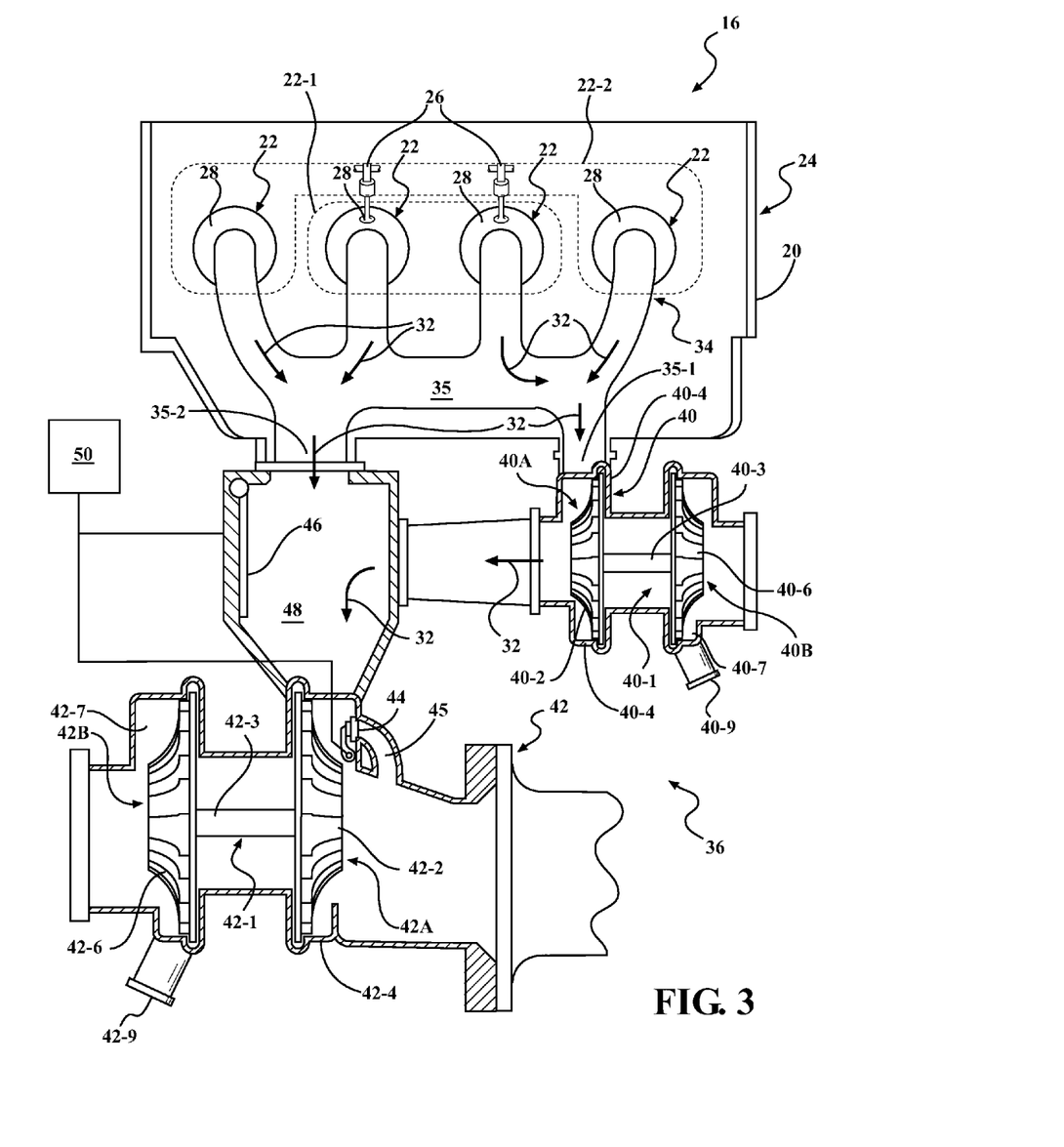
FIG. 3 is a schematic partially cross-sectional top view of an engine with the multi-stage turbocharging system shown in FIG. 1 operating in all-cylinders-activated mode.
Figure 4:
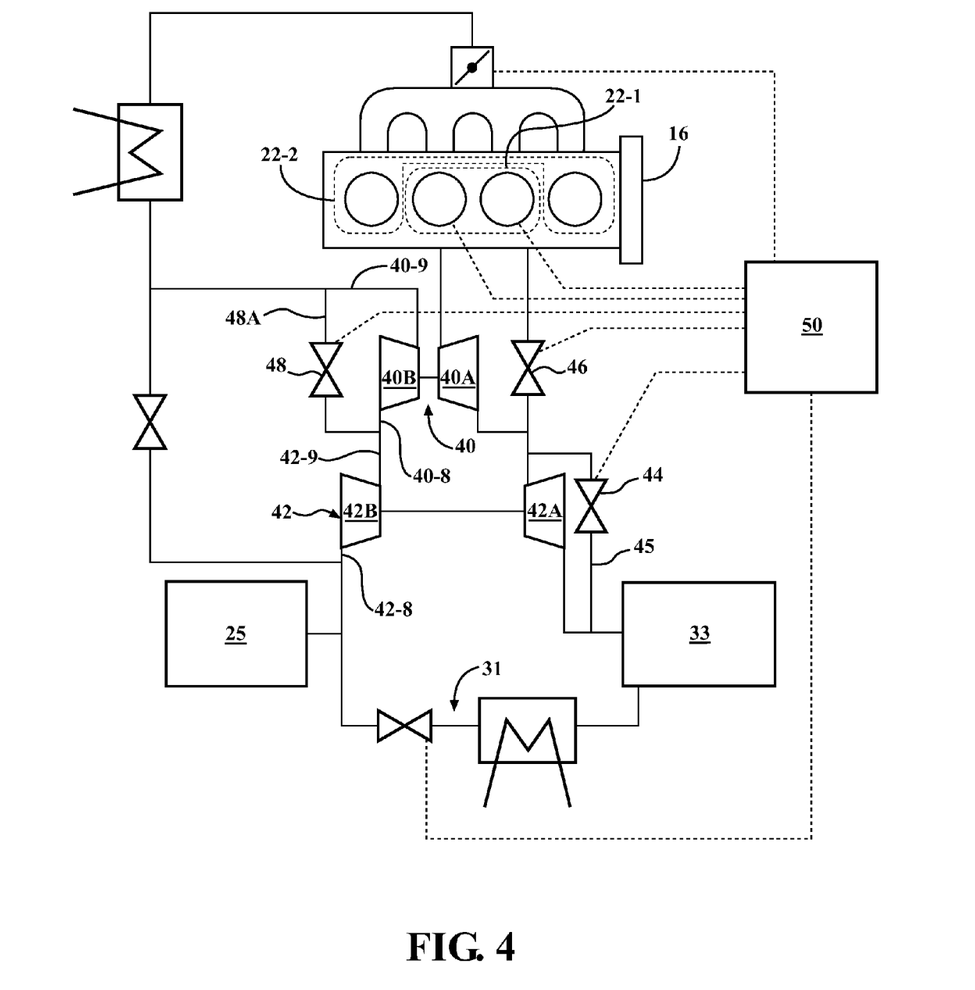
FIG. 4 is a schematic diagram of the engine shown in FIGS. 1-3.

As shown in FIG. 2, the engine 16 includes a cylinder block 20 with a plurality of cylinders 22 arranged therein and a cylinder head 24 that is coupled to the cylinder block. As shown in FIGS. 2-4, the cylinder head 24 may be integrated into or cast together with the cylinder block 20. The cylinder head 24 receives air and fuel from an intake system 25 to be used inside the cylinders 22 for subsequent combustion. The air and fuel or air alone is admitted into the cylinder head 24 for each individual cylinder 22 via appropriately configured valve(s) that are not shown, but known to those skilled in the art.

The cylinders 22 are separated into a first cylinder or set of cylinders 22-1 and a second cylinder or set of cylinders 22-2. The engine 16 also includes a mechanism 26 configured to selectively activate and deactivate the first set of cylinders 22-1 during operation of the engine. The mechanism 26 may include a collapsible valve lifter (shown in FIG. 2), a disengageable rocker arm, or an electromechanical or electromagnetic valve actuation device for each valve operatively connected to each cylinder included in the first set of cylinders 22-1. Although the above-noted disengageable rocker arms and individual electromechanical or electromagnetic valve actuation devices are not specifically shown in the figures, such devices are known to those skilled in the art.

Each cylinder 22 includes a piston, which is not specifically shown, but known to those skilled in the art to reciprocate therein. Combustion chambers 28 are formed within the cylinders 22 between the bottom surface of the cylinder head 24 and the tops of the pistons. As known by those skilled in the art, each of the combustion chambers 28 receives fuel and air from the cylinder head 24 that form a fuel-air mixture for subsequent combustion inside the subject combustion chamber. Although an in-line four-cylinder engine is shown, nothing precludes the present disclosure from being applied to an engine having a different number and/or arrangement of cylinders.

In the case of the in-line four-cylinder engine depicted in the figures, the first set of cylinders 22-1 may include two individual cylinders, while the second set of cylinders 22-2 may include the remaining two individual cylinders. The deactivation of the first set of cylinders 22-1 via the mechanism 26 is intended to permit the engine 16 to operate on only the second set of cylinders 22-2 when a load on the engine is sufficiently low so that power from both the first and second sets of cylinders 22-1, 22-2 is not required to drive the vehicle 10. For example, such low load operation may take place when the vehicle 10 is cruising at a steady state highway speed and the engine 16 is mostly used to overcome air drag and rolling resistance of the vehicle. Accordingly, operation of the engine 16 on solely the second set of cylinders 22-2 permits reduced consumption of fuel when engine power from the first set of cylinders 22-1 is not required to drive the vehicle 10.

The engine 16 also includes a crankshaft (not shown) configured to rotate within the cylinder block 20. As known to those skilled in the art, the crankshaft is rotated by the pistons as a result of an appropriately proportioned fuel-air mixture being burned in the combustion chambers 28. After the air-fuel mixture is burned inside a specific combustion chamber 28, the reciprocating motion of a particular piston serves to exhaust post-combustion gasses 32 from the respective cylinder 22. The cylinder head 24 is also configured to exhaust post-combustion gasses 32 from the combustion chambers 28 to an exhaust system 33 via an exhaust manifold 34. The exhaust system 33 may also include an exhaust gas recirculation (EGR) system 31 (shown in FIG. 4), as understood by those skilled in the art. As shown in FIG. 2, the exhaust manifold 34 may be internally cast, i.e., integrated, into the cylinder head 24. The exhaust manifold 34 defines at least part of a passage 35 that is in fluid communication with the cylinder head 24. The first set of cylinders 22-1 and the second set of cylinders 22-2 discharge the post-combustion gasses 32 into the passage 35. The passage 35 includes two separate outlets, a first outlet 35-1 and a second outlet 35-2, wherein each of the first and second outlets 35-1, 35-2 is defined by the exhaust manifold 34. Accordingly, the post-combustion gasses 32 from each of the first and second sets of cylinders 22-1, 22-2 may exit the exhaust manifold 34 via each of the first outlet 35-1 and the second outlet 35-2.

The engine 16 also includes a turbocharging system 36 configured to develop boost pressure, i.e., pressurize an airflow 38 that is received from the ambient, for delivery to the cylinders 22. The turbocharging system 36 is configured as a two-stage forced induction arrangement for the engine 16. The turbocharging system 36 includes a low-flow turbocharger 40 that is in fluid communication with the passage 35 and configured to be driven by the post-combustion gasses 32 from the first outlet 35-1. The low-flow turbocharger 40 pressurizes and discharges the airflow 38 to the cylinder head 24. Thus pressurized, the airflow 38 is, in turn, delivered to the first and second sets of cylinders 22-1, 22-2 at lower flow rates of the post-combustion gasses 32, which are typically generated at lower rotational speeds, such as below approximately 3,000 RPM, of the engine 16. Additionally, when the first set of cylinders 22-1 is deactivated via the mechanism 26, the low-flow turbocharger 40 can be driven by the post-combustion gasses 32 from the second set of cylinders 22-2 and supply the pressurized airflow 38 to feed the second set of cylinders 22-2 for combustion with an appropriate amount of fuel therein.

The turbocharging system 36 also includes a high-flow turbocharger 42 that is in fluid communication with the passage 35 and configured to be driven by the post-combustion gasses 32 from the second outlet 35-2. The low-flow turbocharger 40 and the high-flow turbocharger 42 are arranged operatively in series, such that the post-combustion gasses 32 may initially be passed through the low-flow turbocharger and then be channeled to the high-flow turbocharger. The high-flow turbocharger 42 pressurizes and discharges the airflow 38 to the cylinder head 24 at higher flow rates of the post-combustion gasses 32, which are typically generated at intermediate and higher rotational speeds, such as around 3,000 RPM and above, of the engine 16. Additionally, when the first set of cylinders 22-1 is deactivated via the mechanism 26, the high-flow turbocharger 42 is not driven by the post-combustion gasses 32 from any of the cylinders 22, and is therefore idle. Accordingly, the high-flow turbocharger 42 is intended to be driven by the post-combustion gasses 32 at higher flow rates and deliver pressurized airflow 38 to both the first and second sets of cylinders 22-1, 22-2, and thus support operation of the engine 16 when both the first and second sets of cylinders are generating power at higher RPM. To support such distinct engine speed ranges and rates of airflow 38, the low-flow turbocharger 40 is typically sized comparatively smaller and thus has a smaller rotating inertia than the high-flow turbocharger 42. As such, the exhaust manifold 34 is operatively connected to the cylinder head 24, while the two separate outlets 35-1 and 35-2 permit two turbochargers 40, 42 to be mounted sufficiently apart.

As shown in FIGS. 2 and 3, each of the turbochargers 40 and 42 includes a respective rotating assembly 40-1 and rotating assembly 42-1. The rotating assemblies 40-1 and 42-1 include respective turbine wheels 40-2 and 42-2 mounted on shafts 40-3 and 42-3, respectively. The turbine wheels 40-2 and 42-2 are rotated along with the respective shafts 40-3, 42-3 by the post-combustion gasses 32. The rotating assembly 42-1 is physically larger than rotating assembly 40-1 such that the high-flow turbocharger 42 may generate the comparatively higher airflow rates required therefrom. The turbine wheels 40-2 and 42-2 are disposed inside respective turbine housings 40-4 and 42-4. Each turbine housing 40-4 and 42-4 includes an appropriately configured, i.e., designed and sized, turbine volute or scroll, a relatively high-pressure inlet, and a relatively low-pressure outlet (not shown in detail, but known to those skilled in the art), that, along with the respective turbine wheel 40-2, 42-2, generates a respective turbine subassembly, a.k.a., a turbine, 40A, 42A. The turbine scrolls of the turbine housings 40-4 and 42-4 receive the post-combustion gasses 32 and direct the gasses to the respective turbine wheels 40-2 and 42-2. The turbine scrolls are configured to achieve specific performance characteristics, such as efficiency and response, of the respective turbocharger 40 and 42. The turbine housing 42-4 of the high-flow turbocharger 42 includes a waste-gate valve 44 (shown in FIGS. 2-4) configured to selectively open and close a bypass 45 for the post-combustion gasses around the turbine of the high-flow turbocharger. On the other hand, the turbine housing 40-4 of the low-flow turbocharger 40 may be configured without a respective waste-gate valve.

Each rotating assembly 40-1, 42-1 also includes a respective compressor wheel 40-6 and 42-6 mounted on the respective shaft 40-3, 42-3. The compressor wheels 40-6 and 42-6 are configured to pressurize the airflow 38 being received from the ambient for eventual delivery to the cylinders 22. The compressor wheels 40-6 and 42-6 are disposed inside respective compressor covers 40-7 and 42-7. Each compressor cover 40-7 and 42-7 includes a compressor volute or scroll, a respective relatively low-pressure inlet 40-8, 42-8, and a respective relatively high-pressure outlet 40-9, 42-9, that, along with the respective compressor wheel 40-6, 42-6, generates a respective compressor subassembly, a.k.a., a compressor, 40B, 42B. As understood by those skilled in the art, the variable flow and force of the post-combustion gasses 32 influences the amount of boost pressure that may be generated by each compressor wheel 40-6 and 42-6 of the respective turbochargers 40 and 42 throughout the operating range of the engine 16. Because the low-flow turbocharger 40 and the high-flow turbocharger 42 are arranged in series, as noted above, the airflow 38 may be received by the compressor 40B of the low-flow turbocharger after having been received by and passed through the compressor 42B of the high-flow turbocharger.

In the engine 16 that includes a plurality of cylinders in each of the first and second sets of cylinders 22-1, 22-2, such as the four-cylinder configuration shown, each of the first outlet 35-1 and the second outlet 35-2 in the exhaust manifold 34 can also be bifurcated into separate branches (not shown). In such a case, each outlet branch 35-1, 35-2 can be connected to an individual passage 35 that leads separately to the respective first and second sets of cylinders 22-1, 22-2. Such an alternative construction of the exhaust manifold 34 may be useful in the event that the turbocharging system 36 employs twin-scroll configuration for each of the low-flow turbocharger 40 and the high-flow turbocharger 42, as understood by those skilled in the art.

As also shown in FIGS. 2 and 3, the turbocharging system 36 includes a first flow-control device 46. The first flow-control device 46 is configured as a bypass valve to selectively direct the post-combustion gasses 32 via the first and second outlets 35-1 and 35-2 to the respective low-flow and high-flow turbochargers 40, 42. When the first and second cylinders 22-1, 22-2 are activated and operating, i.e., when the engine 16 is operating in all-cylinders-activated-mode, the first flow-control device 46 directs the post-combustion gasses 32 via the first outlet 35-1 to the low-flow turbocharger 40 and via the second outlet 35-2 to the high-flow turbocharger 42 (shown in FIG. 3). On the other hand, when the first cylinder 22-1 is deactivated via the mechanism 26, i.e., when the engine 16 is operating in cylinder-deactivation mode, the first flow-control device 46 directs the post-combustion gasses 32 via the first outlet 35-1 to the low-flow turbocharger 40 and blocks the second outlet 35-2 (shown in FIG. 2). As shown, the first flow-control device 46 may be mounted at the second outlet 35-2. The turbocharging system further includes a second flow-control device 48 arranged to selectively open and close the fluid path 48A between the inlet 40-8 and the outlet 40-9 of the low-flow turbocharger's compressor 40B (shown in FIG. 4). Accordingly, the second flow-control device 48 may be configured as an externally controllable one-way valve.

As shown in each of FIGS. 1-3, the vehicle 10 may additionally include a programmable controller 50 configured to regulate operation of the engine, such as by controlling an amount of fuel being injected into the cylinders 22 for mixing and subsequent combustion with the pressurized airflow 38. The controller 50 may be a dedicated engine or powertrain controller, or a central electronic control unit (ECU) for the entire vehicle 10. The controller 50 is also configured to regulate operation of the first flow-control device 46. More particularly, the controller 50 is programmed to open the first flow-control device 46 to direct the post-combustion gasses 32 for driving each of the low-flow turbocharger 40 and the high-flow turbocharger 42 when each of the first and second sets of cylinders 22-1, 22-2 is activated. The controller 50 is also programmed to close the first flow-control device 46 for directing the post-combustion gasses 32 to drive the low-flow turbocharger 40 and block the post-combustion gasses from driving the high-flow turbocharger 42 when the first set of cylinders 22-1 is deactivated. As a result, when the controller 50 commands the first flow-control device 46 to close the second outlet 35-2, the lower flow rates of the post-combustion gasses 32 generated solely by the second set of cylinders 22-2 will be able to efficiently drive the low-flow turbocharger 40. The controller 50 may also be programmed to close the first flow control device 46 to block the second outlet 35-2 and direct the post-combustion gasses 32 via the first outlet 35-1 to the low-flow turbocharger 40 when both the first and second sets of cylinders 22-1, 22-2 are activated and the engine 10 operates up to a predetermined speed. Such a predetermined engine speed may be approximately 3,000 RPM, which is within the operational capability of the low-flow turbocharger 40, as discussed above.

The controller 50 is also configured to regulate operation of the second flow-control device 48. Additionally, the controller 50 coordinates opening of the second flow-control device 48 together with opening of the first flow-control device 46. Furthermore, the controller 50 may open both the first and second flow-control devices 46, 48 simultaneously in order to open the fluid path 48A at substantially the same time as opening the second outlet 35-2. Such simultaneous opening of the first flow-control device 46 and the second flow-control device 48 permits smooth transition between boosted operation of the engine 16 solely on the second set of cylinders 22-2 and boosted operation on both the first and second sets of cylinders 22-1, 22-2, i.e., when the first set of cylinders 22-1 is activated.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
a cylinder block defining a first cylinder and a second cylinder;
a cylinder head coupled to the cylinder block and configured to supply air and fuel to the first cylinder and to the second cylinder for respective combustion therein, and exhaust post-combustion gasses from the first and second cylinders;
a passage in fluid communication with the cylinder head and having a first outlet and a second outlet for exhausting the post-combustion gasses;
a mechanism configured to selectively activate and deactivate the first cylinder;
a programmable controller; and
a turbocharging system configured to pressurize an airflow being received from the ambient for delivery to the cylinder head, the turbocharging system including:
a low-flow turbocharger and a high-flow turbocharger, wherein each of the turbochargers is configured to pressurize the airflow for delivery to the cylinder head, and wherein the low-flow turbocharger is driven by the post-combustion gasses from the first outlet and the high-flow turbocharger is driven by the post-combustion gasses from the second outlet;
a first flow-control device configured to selectively direct the post-combustion gasses via the first and second outlets to the respective low-flow and high-flow turbochargers when the first and second cylinders are activated, direct the post-combustion gasses via the first outlet to the low-flow turbocharger and block the second outlet when the first and second cylinders are activated and the engine operates up to a predetermined speed, and direct the post-combustion gasses via the first outlet to the low-flow turbocharger and block the second outlet when the first cylinder is deactivated via the mechanism; and
a second flow-control device;
wherein:
each of the low-flow and high-flow turbochargers includes a respective compressor configured to pressurize the airflow;
each compressor includes an inlet and an outlet;
the second flow-control device is configured to selectively open and close a fluid path between the inlet and the outlet of the compressor of the low-flow turbocharger; and
the programmable controller is configured to regulate operation of the first flow-control device and the second flow-control device.

2. The engine of claim 1, further comprising an exhaust manifold operatively connected to the cylinder head, wherein the exhaust manifold defines the passage.

3. The engine of claim 2, wherein the exhaust manifold is integrated into the cylinder head.

4. The engine of claim 2, wherein the first flow-control device is mounted at the second outlet.

5. The engine of claim 1, wherein the controller is additionally programmed to:
open the first flow-control device to direct the post-combustion gasses for driving the low-flow turbocharger and the high-flow turbocharger; and
close the first flow-control device to direct the post-combustion gasses for driving the low-flow turbocharger and block the post-combustion gasses from driving the high-flow turbocharger.

6. The engine of claim 5, wherein:
each of the low-flow and high-flow turbochargers includes a respective turbine wheel configured to receive the post-combustion gasses; and
the high-flow turbocharger includes a waste-gate valve configured to selectively open and close a bypass for the post-combustion gasses around the turbine wheel of the high-flow turbocharger.

7. The engine of claim 6, wherein the controller is additionally configured to coordinate opening the second flow-control device together with opening the first flow-control device.

8. The engine of claim 6, wherein the low-flow turbocharger and the high-flow turbocharger are arranged in series such that the airflow is received by the compressor of the low-flow turbocharger after having been received by and passed through by the compressor of the high-flow turbocharger.

9. A vehicle comprising:
a driven wheel; and
a powertrain including an internal combustion engine and a transmission assembly operatively connected to the engine and configured to transmit engine torque to the driven wheel, the engine including:

a cylinder block defining a first cylinder and a second cylinder;

a cylinder head coupled to the cylinder block and configured to supply air and fuel to the first cylinder and to the second cylinder for respective combustion therein, and exhaust post-combustion gasses from the first and second cylinders;

a passage in fluid communication with the cylinder head and having a first outlet and a second outlet for exhausting the post-combustion gasses;

a mechanism configured to selectively activate and deactivate the first cylinder;

a programmable controller; and a turbocharging system configured to pressurize an airflow being received from the ambient for delivery to the cylinder head, the turbocharging system including:

a low-flow turbocharger and a high-flow turbocharger, wherein each of the turbochargers is configured to pressurize the airflow for delivery to the cylinder head, and wherein the low-flow turbocharger is driven by the post-combustion gasses from the first outlet and the high-flow turbocharger is driven by the post-combustion gasses from the second outlet;

a first flow-control device configured to selectively direct the post combustion gasses via the first and second outlets to the respective low-flow and high-flow turbochargers when the first and second cylinders are activated direct the post-combustion gasses via the first outlet to the low-flow turbocharger and block the second outlet when the first and second cylinders are activated and the engine operates up to a predetermined speed, and direct the post-combustion gasses via the first outlet to the low-flow turbocharger and block the second outlet when the first cylinder is deactivated via the mechanism; and a second flow-control device;

wherein:

each of the low-flow and high-flow turbochargers includes a respective compressor configured to pressurize the airflow;

each compressor includes an inlet and an outlet;

the second flow-control device is configured to selectively open and close a fluid path between the inlet and the outlet of the compressor of the low-flow turbocharger; and the programmable controller is configured to regulate operation of the first flow-control device and the second flow-control device.

10. The vehicle of claim 9, wherein the engine additionally includes an exhaust manifold operatively connected to the cylinder head, and wherein the exhaust manifold defines the passage.

11. The vehicle of claim 10, wherein the exhaust manifold is integrated into the cylinder head.

12. The vehicle of claim 9, wherein the first flow-control device is mounted at the second outlet.

13. The vehicle of claim 9, wherein the controller is additionally programmed to:

open the first flow-control device to direct the post-combustion gasses for driving the low-flow turbocharger and the high-flow turbocharger, and close the first flow-control device to direct the post-combustion gasses for driving the low-flow turbocharger and block the post-combustion gasses from driving the high-flow turbocharger.

14. The vehicle of claim 13, wherein:

each of the low-flow and high-flow turbochargers includes a respective turbine wheel configured to receive the post-combustion gasses; and the high-flow turbocharger includes a waste-gate valve configured to selectively open and close a bypass for the post-combustion gasses around the turbine wheel of the high-flow turbocharger.

15. The vehicle of claim 14, wherein the controller is additionally configured to coordinate opening the second flow-control device together with opening the first flow-control device.

16. The vehicle of claim 14, wherein the low-flow turbocharger and the high-flow turbocharger are arranged in series such that the airflow is received by the compressor of the low-flow turbocharger after having been received by and passed through the compressor of the high-flow turbocharger.

* * * * *